(12) United States Patent
Ossareh et al.

(10) Patent No.: US 10,167,804 B2
(45) Date of Patent: *Jan. 1, 2019

(54) SYSTEM AND METHODS FOR CBV DIAGNOSTICS

(71) Applicant: Ford Global Technologies, LLC, Dearborn, MI (US)

(72) Inventors: Hamid-Reza Ossareh, South Burlington, VT (US); Baitao Xiao, Canton, MI (US); Adam Nathan Banker, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 128 days.

This patent is subject to a terminal disclaimer.

(21) Appl. No.: 15/264,348

(22) Filed: Sep. 13, 2016

(65) Prior Publication Data
US 2017/0002762 A1    Jan. 5, 2017

Related U.S. Application Data

(63) Continuation of application No. 14/537,216, filed on Nov. 10, 2014, now Pat. No. 9,441,568.

(51) Int. Cl.
| | |
|---|---|
| *F02B 29/04* | (2006.01) |
| *F02D 41/22* | (2006.01) |
| *F02D 41/00* | (2006.01) |
| *G01M 15/14* | (2006.01) |
| *F01D 17/08* | (2006.01) |
| *F01D 17/10* | (2006.01) |

(Continued)

(52) U.S. Cl.
CPC ......... *F02D 41/221* (2013.01); *F01D 17/085* (2013.01); *F01D 17/105* (2013.01); *F01D 21/003* (2013.01); *F02D 41/0007* (2013.01); *F02D 41/22* (2013.01); *G01M 15/14* (2013.01); *F02D 2200/0414* (2013.01); *F02M 26/23* (2016.02); *Y02T 10/144* (2013.01); *Y02T 10/40* (2013.01)

(58) Field of Classification Search
CPC ...... F02D 41/22; F02D 41/0007; F02D 41/18; F02D 41/221; F02D 41/222; F02D 41/1448; F02D 2200/0414; G01M 15/14; F02B 37/16; F02B 37/18; F02M 26/23; F02M 26/08; Y02T 10/144; Y02T 10/47
USPC ...... 60/600, 611; 73/114.34; 123/559.1, 563, 123/564; 701/103, 107
See application file for complete search history.

(56) References Cited

U.S. PATENT DOCUMENTS

| | | |
|---|---|---|
| 2,988,070 A | 6/1961 | Brueder |
| 4,870,822 A | 10/1989 | Kamimaru |
| 5,275,136 A | 1/1994 | Schechter et al. |

(Continued)

OTHER PUBLICATIONS

Watson, N., et al., "Turbocharging the Internal Combustion Engine," John Wiley & Sons, 1982, pp. 129-133, 3 pages.

*Primary Examiner* — Hai Huynh
*Assistant Examiner* — Gonzalo Laguarda
(74) *Attorney, Agent, or Firm* — Julia Voutyras; McCoy Russell LLP

(57) ABSTRACT

Methods and systems are provided for diagnosing compressor bypass valve degradation. In one example, a method may include indicating degradation of a compressor bypass valve coupled in a compressor bypass based on intake aircharge temperature measured upstream of a compressor inlet via an air charge temperature sensor.

20 Claims, 4 Drawing Sheets

(51) Int. Cl.
*F01D 21/00* (2006.01)
*F02M 26/23* (2016.01)

(56) References Cited

U.S. PATENT DOCUMENTS

| | | |
|---|---|---|
| 6,273,076 B1 | 8/2001 | Beck et al. |
| 7,578,128 B2 | 8/2009 | Miyauchi et al. |
| 7,983,834 B2 | 7/2011 | Blumendeller |
| 8,417,484 B2 | 4/2013 | Ringeisen |
| 8,661,814 B2 | 3/2014 | Ulrey et al. |
| 8,794,000 B2 | 8/2014 | Baldwin et al. |
| 9,091,202 B2 | 7/2015 | Styles et al. |
| 9,267,453 B2 | 2/2016 | Surnilla et al. |
| 9,441,568 B2 * | 9/2016 | Ossareh ................ F02D 41/22 |
| 2012/0014812 A1 | 1/2012 | Blaiklock et al. |
| 2016/0160746 A1 | 6/2016 | Banker et al. |
| 2016/0160868 A1 | 6/2016 | Xiao et al. |
| 2016/0169091 A1 | 6/2016 | Banker et al. |

* cited by examiner

SYSTEM AND METHODS FOR CBV DIAGNOSTICS

CROSS REFERENCE TO RELATED APPLICATION

The present application is a continuation of U.S. patent application Ser. No. 14/537,216, entitled "SYSTEM AND METHODS FOR CBV DIAGNOSTICS," filed on Nov. 10, 2014, now U.S. Pat. No. 9,441,568, the entire contents of which are incorporated herein by reference for all purposes.

FIELD

The present description relates generally to methods and systems for controlling a vehicle engine to diagnose compressor bypass valve (CBV) degradation.

BACKGROUND/SUMMARY

In boosted internal combustion engines, compressed air is delivered to the engine via a compressor, which may be driven by an exhaust turbine. The air is heated as it is compressed. During certain conditions, pressure may build up at the compressor outlet, leading to compressor surge. Compressor surge primarily leads to noise, vibration, and harshness (NVH), but can also cause compressor damage. A compressor bypass valve (CBV) may be used to release pressure in turbocharged engines. By doing this, the CBV prevents compressor surge and reduces wear on the turbocharger and engine. The CBV relieves the damaging effects of compressor surge loading by recirculating the air into the intake upstream of the compressor inlet, increasing the flow rate of air through the compressor and reducing the pressure ratio across the compressor.

A common issue with the CBV is that the valve may become stuck open or closed, causing performance issues. If the valve is stuck open, it will constantly bleed boost, which will effect torque delivery and drivability. If the valve is stuck closed, it is unable to recirculate the air and pressure builds up, potentially leading to a compressor surge. Thus, the CBV may be intermittently diagnosed to account for these issues.

In cases where the compressor bypass valve is stuck open, boost pressure may not build up even with the wastegate completely closed. This triggers an underboost condition. However the reason for underboost may not be immediately known (e.g., stuck wastegate, stuck bypass valve, leak in the air induction system, etc.) and the problem may be difficult to diagnose.

The inventors herein have recognized the above issues and provide an approach to at least partly address them. In one example, the issues described above may be addressed by a method for indicating degradation of a CBV coupled in a compressor bypass based on a comparison of intake aircharge temperature measured upstream of a compressor inlet and air temperature directly downstream of a compressor. In this way, a larger difference in temperature can be measured between ambient air and intake air to help diagnose the CBV.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
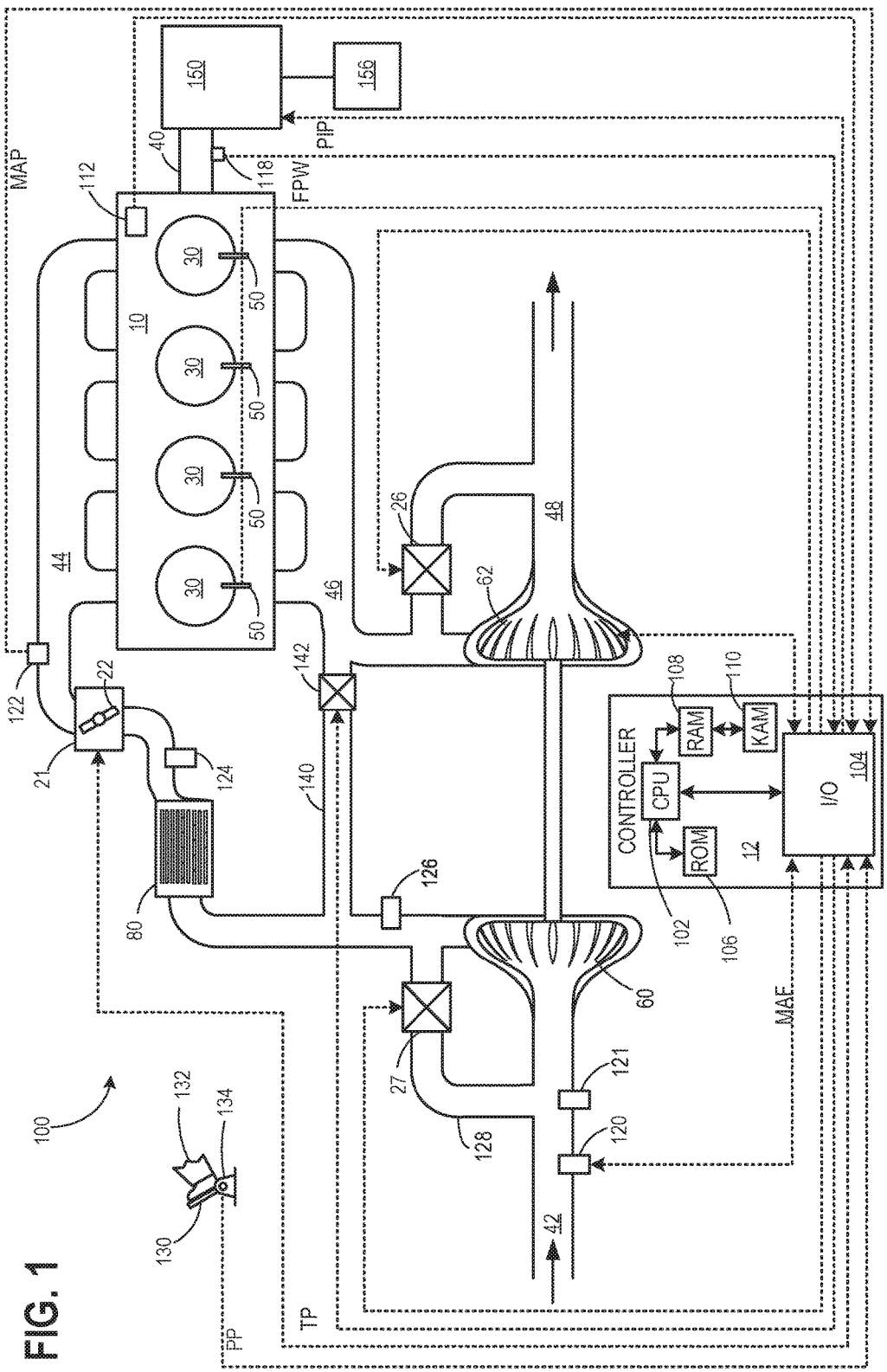
FIG. 1 is a schematic diagram of an example engine system including a CBV and ACT sensor.
Figure 2:
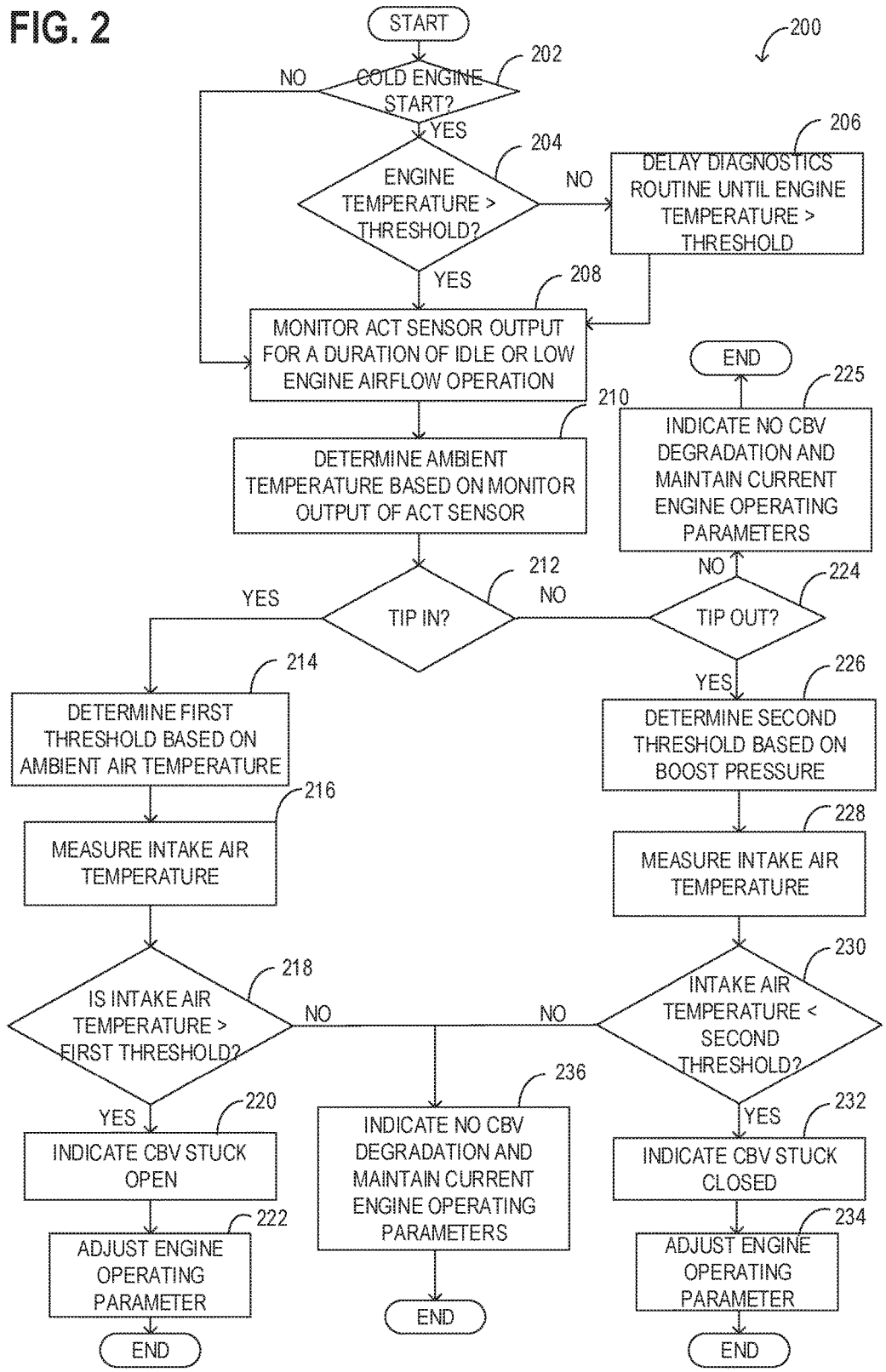
FIG. 2 represents a high-level flow chart depicting CBV diagnostic methods.
Figure 3:
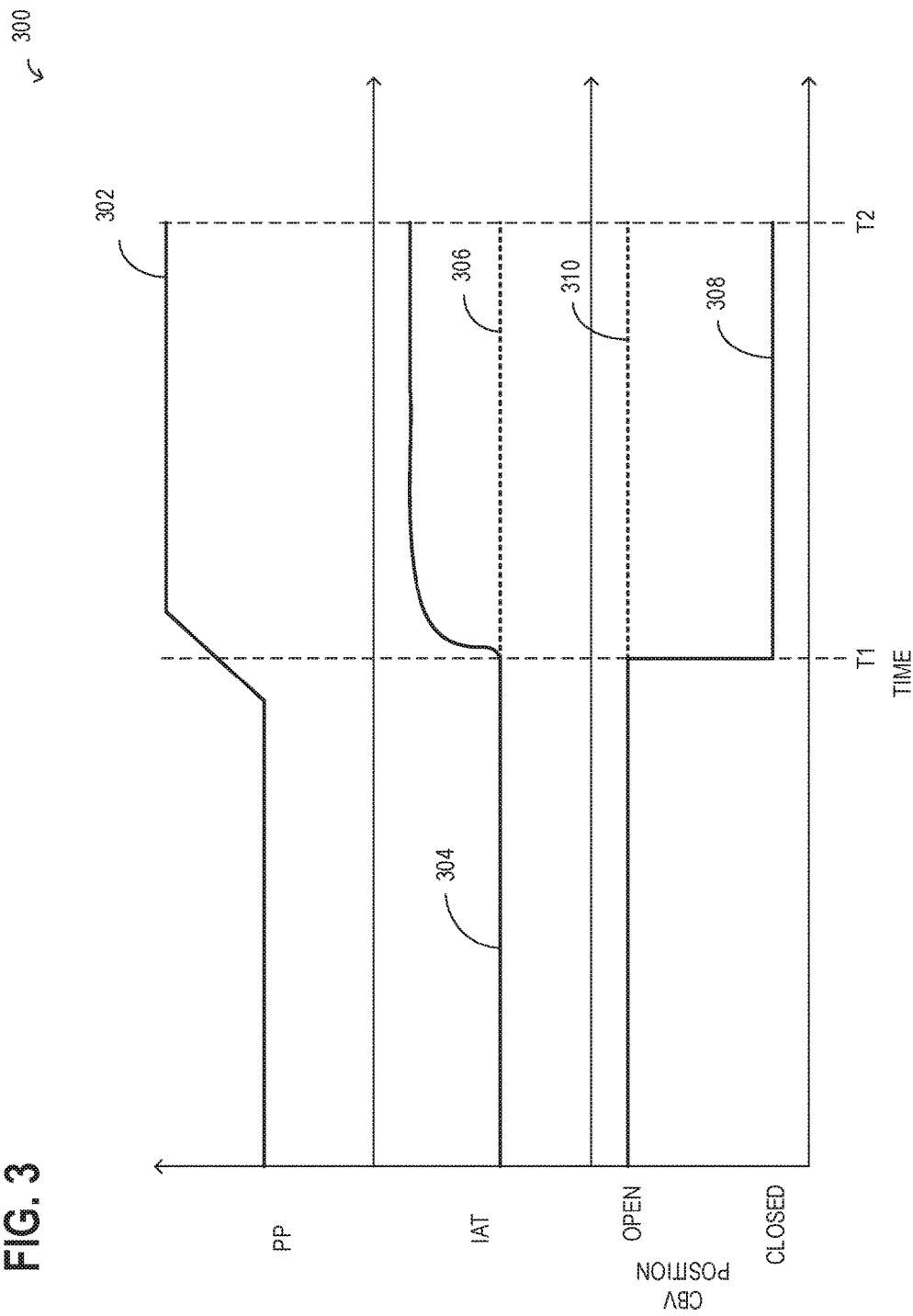
FIG. 3 is a graph representing sample conditions for a diagnosis of a stuck open valve.
Figure 4:
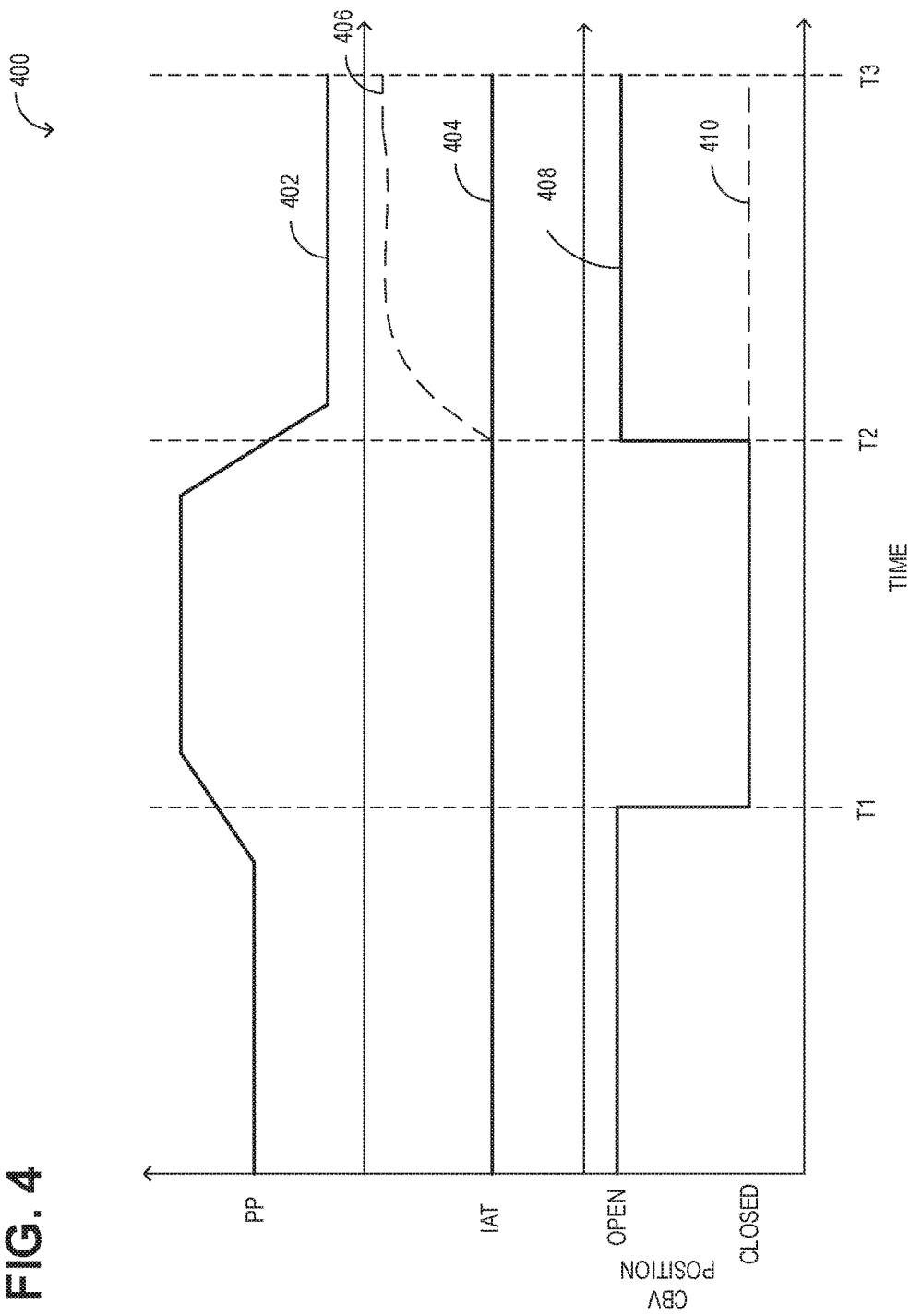
FIG. 4 is a graph representing sample conditions for a diagnosis of a stuck closed valve.

The following description relates to systems and methods for diagnosing compressor bypass valve (CBV) degradation with use of an air charge temperature (ACT) sensor coupled at a junction of a compressor bypass and an air intake passage at a compressor inlet, as shown in the system of FIG. 1. Methods include engine parameter adjustments to alleviate CBV degradation. FIG. 2 shows an example method for diagnosing the CBV based on a comparison of the intake air temperature at the compressor inlet (as measured by the ACT sensor) to a respective threshold. In one example, the controller may set a first threshold temperature based on ambient air temperature to diagnose if the CBV is stuck open. The first threshold may represent current ambient air temperature, which may be substantially equal to compressor intake air temperature if the CBV is closed. This is because hot, compressed air is unable to flow back to the compressor intake and warm up the ambient air if the CBV is closed. Thus, if the compressor inlet air temperature does not meet a condition relative to the first threshold (e.g., if the compressor inlet air temperature is greater than the first threshold), the CBV may be indicated to be stuck open. Likewise, determining a second threshold based on boost pressure may assist in diagnosing if the CBV is stuck closed. The second threshold may represent an estimation of compressor air temperature, which is hotter than ambient air temperature. If a signal is sent to open the CBV and a temperature spike is not measured by the ACT sensor (e.g., if the temperature measured by the ACT sensor is below the second threshold), the valve may be degraded. FIGS. 3-4 represent sample scenarios detailing outcomes and adjustments during instances of the CBV being stuck open or closed.

FIG. 1 is a schematic diagram showing an example engine system 100, including an engine 10, which may be included in a propulsion system of an automobile. The engine 10 is shown with four cylinders 30. However, other numbers of cylinders may be used in accordance with the current disclosure. Engine 10 may be controlled, at least partially, by a control system including controller 12, and by input from a vehicle operator 132 via an input device 130. In this example, input device 130 includes an accelerator pedal and a pedal position sensor 134 for generating a proportional pedal position signal PP. As such, the pedal position signal may indicate a tip-in (e.g., sudden increase in pedal position), a tip-out (e.g., sudden decrease in pedal position or release of the accelerator pedal), and additional driving conditions.

Each combustion chamber (e.g., cylinder) 30 of engine 10 may include combustion chamber walls with a piston (not shown) positioned therein. The pistons may be coupled to a crankshaft 40 so that reciprocating motion of the piston is translated into rotational motion of the crankshaft. Crankshaft 40 may be coupled to at least one drive wheel 156 of a vehicle via an intermediate transmission system 150. Further, a starter motor may be coupled to crankshaft 40 via a flywheel to enable a starting operation of engine 10.

Combustion chambers 30 may receive intake air from intake manifold 44 via intake passage 42 and may exhaust combustion gases via exhaust manifold 46 to exhaust passage 48. Intake manifold 44 and exhaust manifold 46 can selectively communicate with combustion chamber 30 via respective intake valves and exhaust valves (not shown). In some embodiments, combustion chamber 30 may include two or more intake valves and/or two or more exhaust valves.

Fuel injectors 50 are shown coupled directly to combustion chamber 30 for injecting fuel directly therein in proportion to the pulse width of signal FPW received from controller 12. In this manner, fuel injector 50 provides what is known as direct injection of fuel into combustion chamber 30; however it will be appreciated that port injection is also possible. Fuel may be delivered to fuel injector 50 by a fuel system (not shown) including a fuel tank, a fuel pump, and a fuel rail.

Intake passage 42 may include throttle 21 having a throttle plate 22 to regulate air flow to the intake manifold. In this particular example, the position (TP) of throttle plate 22 may be varied by controller 12 to enable electronic throttle control (ETC). In this manner, throttle 21 may be operated to vary the intake air provided to combustion chamber 30 among other engine cylinders. In some embodiments, additional throttles may be present in intake passage 42, such as a throttle upstream of the compressor 60 (not shown).

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger.

Engine 10 may further include a compression device such as a turbocharger or supercharger including at least a compressor 60 arranged along intake manifold 44. For a turbocharger, compressor 60 may be at least partially driven by a turbine 62, via, for example a shaft, or other coupling arrangement. The turbine 62 may be arranged along exhaust passage 48. Various arrangements may be provided to drive the compressor. For a supercharger, compressor 60 may be at least partially driven by the engine and/or an electric machine, and may not include a turbine. Thus, the amount of compression provided to one or more cylinders of the engine via a turbocharger or supercharger may be varied by controller 12.

Further, exhaust passage 48 may include wastegate 26 for diverting exhaust gas away from turbine 62. Additionally, intake passage 42 may include a compressor bypass valve (CBV) 27 configured to recirculate boosted aircharge from downstream of the compressor 60 and upstream of a condensed air cooler (CAC) 80 to the compressor inlet via a compressor bypass passage 128. For example, wastegate 26 and/or CBV 27 may be controlled by controller 12 to be opened when a lower boost pressure is desired. For example, in response to compressor surge or a potential compressor surge event, the controller 12 may open the CBV 27 to decrease pressure at the outlet of the compressor 60. This may reduce or stop compressor surge. CBV 27 is positioned in a compressor bypass passage 128 fluidically coupling the intake passage 42 upstream of the compressor 60 to the intake passage downstream of the compressor 60. Also included in intake passage 42 is an ACT sensor 121. The ACT sensor is coupled at a junction of the compressor bypass 128 and the intake passage 42 at the compressor inlet. Additionally or alternatively, the ACT sensor 121 may be placed downstream of the junction of the compressor bypass 128 and the intake passage 42 and upstream of the compressor 60. The ACT sensor 121 may be controlled by controller 12 to measure temperatures to obtain a reference ambient air temperature and an intake air temperature upstream of the compressor during instances of a valve stuck open or closed (e.g., during tip in and tip out, respectively).

Intake passage 42 may further include charge air cooler (CAC) 80 (e.g., an intercooler) to decrease the temperature of the turbocharged or supercharged intake gases. In some embodiments, charge air cooler 80 may be an air to air heat exchanger. In other embodiments, charge air cooler 80 may be an air to liquid heat exchanger. In yet other embodiments, the CAC 80 may be a variable volume CAC. Hot charge air from the compressor 60 enters the inlet of the CAC 80, cools as it travels through the CAC, and then exits to pass through the throttle 21 and then enter the engine intake manifold 44. Ambient air flow from outside the vehicle may enter engine 10 through a vehicle front end and pass across the CAC, to aid in cooling the charge air.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10 for performing various functions to operate engine 10, in addition to those signals previously discussed, including measurement of inducted mass air flow (MAF) from mass air flow sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses each revolution of the crankshaft 40.

Other sensors that may send signals to controller 12 include a temperature and/or pressure sensor 124 at the outlet of the charge air cooler 80, and a boost pressure sensor 126. Other sensors not depicted may also be present, such as a sensor for determining the intake air velocity at the inlet of the charge air cooler, and other sensors. In some examples, storage medium read-only memory 106 may be programmed with computer readable data representing instructions executable by microprocessor unit 102 for performing the methods described below as well as other variants that are anticipated, but not specifically listed. Example routines and conditions are explained herein at FIGS. 2-4.

Turning now to FIG. 2, a high-level flow chart detailing method 200 for identifying a CBV degradation and adjustments thereof is presented. As described above, intake air temperature is compared to a first threshold to diagnose if the CBV is stuck open, where the first threshold is based on ambient air temperature. Also described above, intake air temperature is compared to a second threshold to diagnose if the CBV is stuck closed, where the second threshold is based on boost pressure. Method 200 will be described herein with reference to components and systems depicted in FIG. 1, particularly, regarding air intake 42, compressor 60, CAC 80, CBV 27, and ACT 121. Method 200 may be carried out by controller 12 according to a computer readable media stored thereon. It should be understood that the method 200 may be applied to other systems of a different configuration without departing from the scope of this disclosure.

At 202, the method determines if the engine is operating under cold start conditions. A cold engine start may be defined as an engine temperature below a predetermined threshold, such as ambient temperature. If the engine is operating under cold start, then the method may proceed to 204, however, if the engine is not operating under cold start, then the method may proceed to 208. A non-cold engine start may be defined as an engine operation (which may or may not include an engine start) where the engine temperature is greater than a predetermined threshold, such as greater than ambient temperature. At 204, the method measures the engine temperature against the predetermined threshold. If the engine temperature is above the threshold then the method may proceed to 208. If the engine temperature remains below the threshold, then the method will proceed to 206 and delay diagnostics until the engine temperature is greater than the threshold. The method may not be performed at a cold start because the engine temperature rises during this period and as a result, the air charge temperature (ACT) sensor may not be able to detect ambient temperature accurately.

At 208, the ACT sensor is monitored during engine idle or low engine airflow conditions following engine warm-up. During idle or low engine flow operation, the boost pressure may be close to ambient pressure. Therefore, no air flows through the CBV regardless of whether the CBV is open or closed. As a result, an ACT reading at the compressor intake is equal to ambient air temperature during these conditions. At 210, the intake aircharge ambient temperature is measured based on the output of the ACT sensor, where the ACT sensor is coupled at a junction of the compressor bypass and an air intake passage upstream of the compressor inlet. The determining of intake air ambient temperature determines the first threshold for a tip in, described below. As an example, the first threshold increases as ambient air temperature increases. The method may proceed to 212.

At 212, the controller determines if a tip-in has occurred. As an example, tip-in may be determined based on increased boost demand or if the tip-in is a tip-in beyond an upper threshold pedal position, e.g., if the accelerator pedal is depressed past a threshold position. If the answer is yes, then the method may proceed to 214. If the answer is no, then the method may proceed to 224. 224 and subsequent steps will be discussed in further detail below. At 214, the method determines a first threshold intake aircharge temperature based on ambient air temperature. In one example, the first threshold is current ambient temperature. Further, the first threshold may increase as ambient air temperature increases. During instances of high boost demand, it may be desired to close the CBV in order to route all the intake air through the compressor to meet the boost demand, providing an opportunity to measure if the CBV is degraded. As an example, if the CBV is closed, compressor intake air temperature will be substantially equal to ambient air temperature. However, if the CBV is stuck open, air may flow through the compressor bypass pathway, passing by the ACT sensor before being directed through the compressor. Since the compressed air is hotter than ambient temperature, the ACT sensor may indicate a higher temperature than ambient temperature when the CBV is open. Therefore, a temperature higher than ambient during high torque demand conditions may indicate a CBV is stuck open since a signal has been sent to close the CBV, yet the hot, compressed air is still being recirculated back upstream of the compressor. At 216, the controller measures an intake air temperature based on an ACT sensor output. At 218, the intake air temperature is measured against the first threshold. If the intake air temperature is greater than the first threshold, then the method may continue to 220 and indicate degradation of a CBV coupled in a compressor bypass. As explained above, during times of tip-in (e.g., high torque) the controller will close the CBV in response to boost demand, and all the compressed air will be directed towards the engine. If intake air is hotter than expected (e.g., greater than the first threshold), it may indicate that the CBV is stuck open, as the hot, compressed air is continually recirculated back to the compressor inlet instead of being directed to the engine, and thus CBV degradation is indicated. A CBV that is stuck open (e.g., a CBV that is unable to partially and/or fully close) may cause reduced torque delivery and drivability. Thus, at 222, the controller may adjust engine operating parameters to ameliorate the degraded CBV. As an example, if the CBV is stuck open, the controller may close the wastegate to assist compressed air flow to the engine by directing more exhaust towards the turbine to ensure there is no torque loss. In contrast, if the intake air temperature is less than the first threshold at 218, then the method may indicate no CBV degradation and maintain current engine operating parameters at 236. The method may exit.

In another example, further embodiments may include a continuously variable compressor recirculation valve (CCRV) instead of a CBV. In the case of a CCRV, a stuck open condition may still be measured during tip-in, however, the first threshold also accounts for the position of the valve. As an example, if the CCRV is 80% closed due to instructions from the controller, determination of the first threshold may account for the mixture of ambient air along with the compressed air flow through the compressor bypass pathway to the compressor intake.

Returning to 212, if no tip-in has occurred, the method proceeds to 224, where the controller determines if a tip-out has occurred. As an example, the controller may determine the tip-out based on decreased boost demand and/or where the tip-out is a tip-out beyond a lower threshold pedal position, e.g., a tip-out may be determined if the accelerator pedal is released from a depressed position. If the tip-out has not occurred, the method may proceed to 225. At 225, the controller may indicate no valve degradation and maintain current engine operating parameters. The method may exit. Alternatively, if it is determined that the tip-out has occurred, the method may proceed to 226. At 226, the controller determines a second threshold based on a boost pressure. The second threshold may represent the expected temperature at the compressor outlet and thus the second threshold may depend on the compressor outlet air temperature (estimated based on boost pressure). The CBV may be signaled to open during tip-outs. During tip-outs, the controller may open the CBV to dump boost and prevent compressor surge, resulting in a temperature spike at the ACT sensor from the flow of hot, compressed air to the compressor intake. Thus, the ACT measurements when the CBV is open may be similar to compressor outlet air temperature and as a result, substantially equal to the second threshold. If the CBV is stuck closed, a temperature spike is not detected, resulting in an ACT measurement below the second threshold, indicating the CBV is stuck closed. The second threshold increases as the boost pressure increases. As an example, compressed air temperature may be estimated via boost pressure and/or demand, which is based on the tip-out. In general, the second threshold is larger than the first threshold due to its dependence on the temperature of the compressed air.

Once the second threshold is determined, the controller measures an intake air temperature at 228, based on output from the ACT sensor. At 230, the intake air temperature is compared to the second threshold. During a tip-out event, the CBV may be commanded open to recirculate air back to the compressor inlet in order to increase flow through the compressor to avoid surge that otherwise might occur due to the low flow conditions following the tip-out. When the CBV is open, the temperature of the intake air at the compressor inlet may increase as a result of the recirculation of the hot compressed air. Thus, if the intake air temperature is less than the second threshold, it indicates that hot compressed air is not flowing back to the compressor intake (e.g., due to the closed CBV) and the temperature of the intake air is lower than expected. As an example, as tip-out occurs and boost demand decreases, the controller opens the CBV and reduces compressed airflow to the engine. If the intake air temperature is below the second threshold, the CBV may be stuck closed and NVH may occur, and the method may proceed to 232. At 232 the method includes indicating degradation of the CBV coupled in a compressor bypass based on intake aircharge temperature measured upstream of a compressor inlet wherein the degradation includes the CBV being stuck closed. At 234, the controller may adjust engine operating parameters to alleviate CBV degradation. As an example, if a tip-out has occurred and the controller determines CBV degradation, the controller may adjust engine operating parameters to increase flow through the compressor, such as adjust an exhaust gas recirculation (EGR) rate, adjust a throttle position, or other adjustment.

If the intake air temperature is above the second threshold, then compressed air is able to flow back to the compressor inlet (e.g., due to open CBV) and the method may continue to 236. At 236, the controller indicates no CBV degradation and may maintain current engine operating parameters. The method may end.

FIG. 2 represents a method detailing diagnosis of a CBV degradation based on compressor inlet temperature compared to either a first threshold based on ambient air temperature or a second threshold based on boost pressure, for both CBV stuck open or closed, respectively. The following figures represent example engine conditions when operating with a CBV that is stuck open or closed.

In another example, a threshold range may be invoked to determine a CBV degradation. As one example, diagnosis of a CBV being stuck open may include a maximum threshold range that an ambient temperature may increase (e.g., temperature increase of 30° C.) during a method to determine if the CBV is stuck open. If the ambient air temperature increases above this threshold range then the CBV may be indicated degraded. The CBV degradation may include the CBV being stuck open. As a second example, diagnosis of the CBV being stuck closed may include the same maximum threshold, however, if the temperature does not increase beyond the threshold range during a period of aggressive tip-out then the CBV may be degraded. The degradation may include the CBV being stuck closed.

FIG. 3 represents a plot of graphs depicting an example scenario of a tip-in and a CBV that is stuck open. The x-axis represents time and the y-axis represents different engine parameters. Graph 302 represents pedal position (PP), graph 304 represents measured intake air temperature (IAT), and graph 306 represents expected IAT for the sample scenario. Graph 308 represents the expected position of the CBV (e.g., the commanded position) and 310 represents the actual CBV position.

Prior to T1, the PP is neither above a threshold to indicate wide-open throttle (e.g., tip-in) nor below a threshold to indicate a substantially closed throttle (e.g., tip-out). As a result, the CBV is open because the engine does not demand the full amount of compressed air. IAT is substantially equal to an ambient air temperature. At T1, the CBV valve is commanded closed due to an increase in PP, as shown by graph CBV. As PP increases, the throttle opening is wider and the engine requests more compressed air (e.g., boost demand increases). In order to fulfill this demand, the controller closes the CBV to disable compressed air bypass to the compressor intake.

After T1 and prior to T2, the PP is increased to a position above a threshold in response to a higher boost, indicating the tip-in is a tip-in to wide-open throttle or to an increased torque demand. The controller expects to keep the CBV closed, 308, to provide increased boost pressure and intake temperature. Since the CBV is expected closed, the controller expects to see an IAT similar to the graph of 306, however, it receives the result of 304 because the actual CBV position is open. The change in boost demand is responsive to a pedal tip-in, indicating that the compressor bypass valve is stuck open based on the actual temperature being higher than the expected temperature. The CBV is degraded and the degradation includes the CBV being stuck open. The actual CBV position being stuck open, as shown by graph 310, enables the flow of hot, compressed air back to the intake which raises IAT above a first threshold based on ambient air temperature. At T2, the controller may indicate the CBV is degraded.

FIG. 4 represents a plot of graphs depicting a tip-out and a CBV that is stuck closed. The x-axis represents time and the y-axis represents different engine parameters. Graph 402 represents pedal position (PP), graph 404 represents an expected intake air temperature (IAT) and graph 406 represents an actual intake air temperature for that scenario. Graph 408 depicts expected CBV position and 410 represents the actual CBV position.

Prior to T1, the PP is neither above a threshold to indicate wide-open throttle nor below a threshold to indicate a substantially closed throttle. As a result, the CBV is open because the engine does not demand the full amount of compressed air compressed by the compressor. IAT is substantially equal to an ambient air temperature. At T1, the CBV valve is closed due to an increase in PP. As PP increases, the throttle opening is wider and the engine requests more compressed air. In order to fulfill this demand, the controller closes the CBV to disable compressed air bypass. After T1 and prior to T2, the PP is increased to a position above a, indicating the tip-in is a tip-in to wide-open throttle or to an increased torque demand. The controller keeps the CBV closed to provide maximum boost pressure and intake temperature. Since the CBV is closed, IAT remains fairly constant. At T2, PP drops to a level below a threshold indicating a substantially closed throttle and lower boost condition. A lower boost condition includes a tip-out and the tip-out is an aggressive tip-out to substantially close the throttle. Therefore, the controller opens the CBV to decrease compressed air flow to the engine and bypass the compressed air back to the compressor air intake resulting in an increased IAT, 404. As an example, at low torque or low boost events, the controller may open the CBV to prevent compressor surge. Boost demand is responsive to a pedal tip-out, and decreases as the pedal is released, also signaling to open the CBV. If the CBV is open, 408, a temperature spike is measured, however, since the actual CBV position is stuck closed, 410, the temperature remains fairly constant. The CBV being stuck closed prevents hot, compressed air flow back to the compressor intake and results in an intake air temperature substantially equal to ambient air temperature. Thus, the IAT is below a second threshold based on boost pressure and at T3 the controller may indicate CBV degradation.

In this way, placing the compressor bypass passage inlet downstream of the compressor and upstream of the CAC, the hot, compressed air is delivered back directly to the compressor air intake when the CBV is open, permitting the ACT sensor to measure a much larger air intake temperature than ambient temperature. By measuring a larger air intake temperature, the method's percent error is decreased, providing more reliable data to the controller.

The technical effect of measuring intake air temperature at a compressor intake and measuring it against a threshold based on ambient air temperature measured at the compressor intake allows the method to diagnose CBV degradation more accurately. As a result of ACT sensor placement, along with compressor bypass pathway placement, a larger temperature gradient is created between the ambient temperature and intake air temperature when the CBV is open, enabling a larger diagnostic range to detect CBV degradation accurately.

In an embodiment, method for an engine comprises indicating degradation of a compressor bypass valve coupled in a compressor bypass based on intake aircharge temperature measured upstream of a compressor inlet. The intake aircharge temperature is measured by a temperature sensor coupled at a junction of the compressor bypass and an air intake passage at the compressor inlet. The method, additionally or alternatively, may comprise the compressor bypass being configured to recirculate boosted aircharge from downstream of the compressor and upstream of a charge air cooler to the compressor inlet.

Additionally or alternatively, the indicating may include during higher boost conditions, indicating degradation of the compressor bypass valve based on intake aircharge temperature being higher than a first threshold, the first threshold based on ambient temperature. Indicating degradation includes indicating the compressor bypass valve is stuck open when the intake aircharge temperature is higher than the first threshold. The higher boost condition includes a tip-in. In response to the indication of the compressor bypass valve being stuck open, closing a wastegate.

The method, additionally or alternatively, may include the ambient temperature being measured by the temperature sensor during engine idle conditions following engine warm-up. The indicating, additionally or alternatively, may include during lower boost conditions, indicating degradation of the compressor bypass valve based on intake aircharge temperature being lower than a second threshold. The second threshold is based on boost pressure. The indicating degradation includes indicating the compressor bypass valve is stuck closed when the intake aircharge temperature is lower than the second threshold. The lower boost condition includes a tip-out.

Another method for a boosted engine comprises, indicating degradation of a compressor bypass valve (CBV) in response to intake aircharge temperature at a compressor inlet being higher than a first threshold during a tip-in and indicating degradation of the CBV in response to intake aircharge temperature at the compressor inlet being lower than a second threshold during a tip-out. The tip-in is a tip-in to beyond an upper threshold pedal position, and wherein the tip-out is a tip-out to beyond a lower threshold pedal position. The first threshold is based on ambient temperature, and the second threshold is based on boost pressure at the tip-out.

The method, additionally or alternatively, may include the first threshold increasing as ambient temperature increases, and the second threshold increasing as boost pressure increases. The indicating, additionally or alternatively, may include indicating degradation during tip-in includes indicating the CBV is stuck open and the indicating degradation during tip-out includes indicating the CBV is stuck closed. The temperature sensor is positioned at a junction of a compressor bypass and an air intake passage at the compressor inlet, the compressor bypass coupling the intake passage from downstream of a charge air cooler to the compressor inlet.

An embodiment of a system comprises a boosted engine having an air intake passage, an accelerator pedal for receiving an operator boost demand, an intake compressor, a compressor bypass including a compressor bypass valve recirculating aircharge from downstream of the compressor to a compressor inlet, a temperature sensor coupled at junction of the compressor bypass and the air intake passage, and a controller with computer-readable instructions for indicating degradation of the compressor bypass valve based on an actual intake air temperature measured at the temperature sensor relative to an expected intake air temperature, the expected intake air temperature based on the change in boost demand. The compressor is driven by an exhaust turbine, the system further includes a wastegate coupled across the turbine, and wherein the controller includes further instructions for closing the wastegate in response to the indicating of the compressor bypass valve being stuck open.

The indicating, additionally or alternatively, may include indicating that the compressor bypass valve is stuck open based on the actual temperature being higher than the expected temperature when the change in boost demand is responsive to a pedal tip-in and indicating that the compressor bypass valve is stuck closed based on the actual temperature being lower than the expected temperature when the change in boost demand is responsive to a pedal tip-out.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for diagnosing a continuously variable compressor bypass valve of an engine, comprising:
adjusting the continuously variable compressor bypass valve responsive to operating conditions of the engine; and
indicating degradation of the compressor bypass valve coupled in a compressor bypass based on intake aircharge temperature being different then a threshold temperature measured upstream of a compressor inlet, and changing engine operating parameters due to the indication.

2. The method of claim 1, wherein if the compressor bypass valve is stuck open, changing the engine operating parameters includes close a wastegate valve.

3. The method of claim 1, wherein if the compressor bypass valve is stuck closed, changing the engine operating parameters includes increasing flow through a compressor.

4. The method of claim 3, wherein increasing flow through the compressor includes adjusting a throttle position.

5. The method of claim 3, wherein increasing flow through the compressor includes adjusting an exhaust gas recirculation (EGR) rate.

6. The method of claim 1, wherein the intake aircharge temperature is measured by a temperature sensor coupled at a junction of the compressor bypass and an air intake passage at the compressor inlet.

7. The method of claim 1, wherein the compressor bypass is configured to recirculate boosted aircharge from downstream of a compressor and upstream of a charge air cooler to the compressor inlet.

8. The method of claim 1, wherein the indicating includes, during higher boost conditions, indicating degradation of the compressor bypass valve based on the intake aircharge temperature being higher than a first threshold, the first threshold based on ambient temperature.

9. The method of claim 8, wherein indicating degradation of the compressor bypass valve includes indicating the compressor bypass valve is stuck open.

10. The method of claim 8, wherein the ambient temperature is measured by a temperature sensor during engine idle conditions following engine warm-up.

11. The method of claim 9, wherein the indicating further includes, during lower boost conditions, indicating degradation of the compressor bypass valve based on the intake aircharge temperature being lower than a second threshold.

12. The method of claim 11, wherein the second threshold is based on boost pressure.

13. The method of claim 11, wherein indicating degradation of the compressor bypass valve includes indicating the compressor bypass valve is stuck closed.

14. The method of claim 13, wherein the higher boost conditions include a tip-in, and the lower boost conditions include a tip-out.

15. The method of claim 13, further comprising, in response to the indication of the compressor bypass valve being stuck open, closing a wastegate.

16. A method for diagnosing a continuously variable compressor bypass valve of a boosted engine, comprising:
during a tip-in, indicating degradation of the continuously variable compressor bypass valve (CBV) in response to intake aircharge temperature at a compressor inlet being higher than a first threshold; and
during a tip-out, indicating degradation of the CBV in response to intake aircharge temperature at the compressor inlet being lower than a second threshold, and changing engine operating parameters due to the indication.

17. The method of claim 16, wherein the tip-in is a tip-in to beyond an upper threshold pedal position, and wherein the tip-out is a tip-out to beyond a lower threshold pedal position.

18. The method of claim 16, wherein the first threshold is based on ambient temperature, and the second threshold is based on boost pressure at the tip-out.

19. The method of claim 16, wherein the first threshold increases as ambient temperature increases, and the second threshold increases as boost pressure increases.

20. The method of claim 16, wherein the indicating degradation during the tip-in includes indicating the CBV is stuck open, and the indicating degradation during the tip-out includes indicating the CBV is stuck closed.

* * * * *